Feb. 6, 1951     R. WISTAR     2,540,363
DEVICE FOR RECORDING ANSWERS TO EXAMINATION QUESTIONS
Filed Jan. 26, 1946     2 Sheets-Sheet 1

INVENTOR
Richard Wistar
BY
Mellin & Hanscom
ATTORNEYS

Feb. 6, 1951 R. WISTAR 2,540,363
DEVICE FOR RECORDING ANSWERS TO EXAMINATION QUESTIONS
Filed Jan. 26, 1946 2 Sheets-Sheet 2

INVENTOR
Richard Wistar
BY
Mellin + Hanscom
ATTORNEYS

Patented Feb. 6, 1951

2,540,363

UNITED STATES PATENT OFFICE 2,540,363

DEVICE FOR RECORDING ANSWERS TO EXAMINATION QUESTIONS

Richard Wistar, Oakland, Calif.

Application January 26, 1946, Serial No. 643,592

4 Claims. (Cl. 35—48)

1

This invention relates to devices for use in recording answers to multiple choice examination questions.

Devices have been heretofore provided which are capable of sensibly indicating to the examinee whether or not the answer selected is the correct one. This enables the ultimate selection of the correct answer and informing the examinee thereof for retention, while recording the number, if any, of incorrect answers previously selected for the information of the examiner.

It is the principal object of the present invention to provide an improved device of the character referred to which may be formed of a single sheet of material and thus be inexpensively produced.

One form which the invention may assume is exemplified in the following description and illustrated by way of example in the accompanying drawings, in which.

Figure 1:
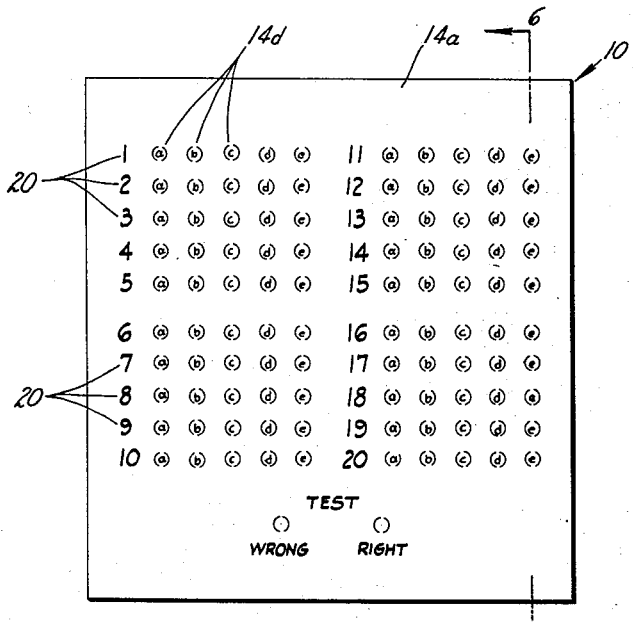
Fig. 1 is a plan view of a device embodying one form of my invention.
Figure 6:
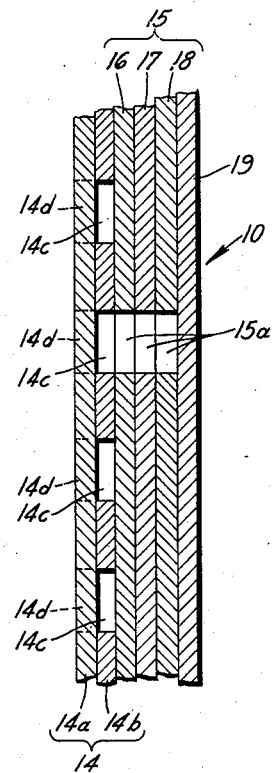
Fig. 6 is a cross-sectional view through the device taken on line 6—6 of Fig. 1.
Figure 2:
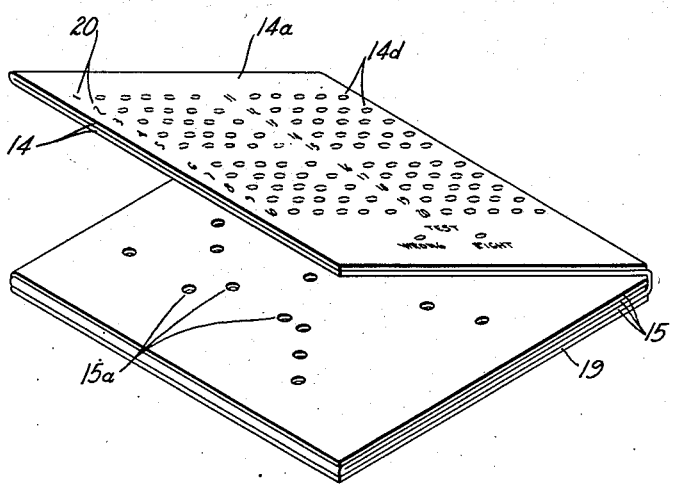
Fig. 2 is a perspective view of the device with the recording or work sheet upraised to disclose the answer pattern sheet.
Figure 3:
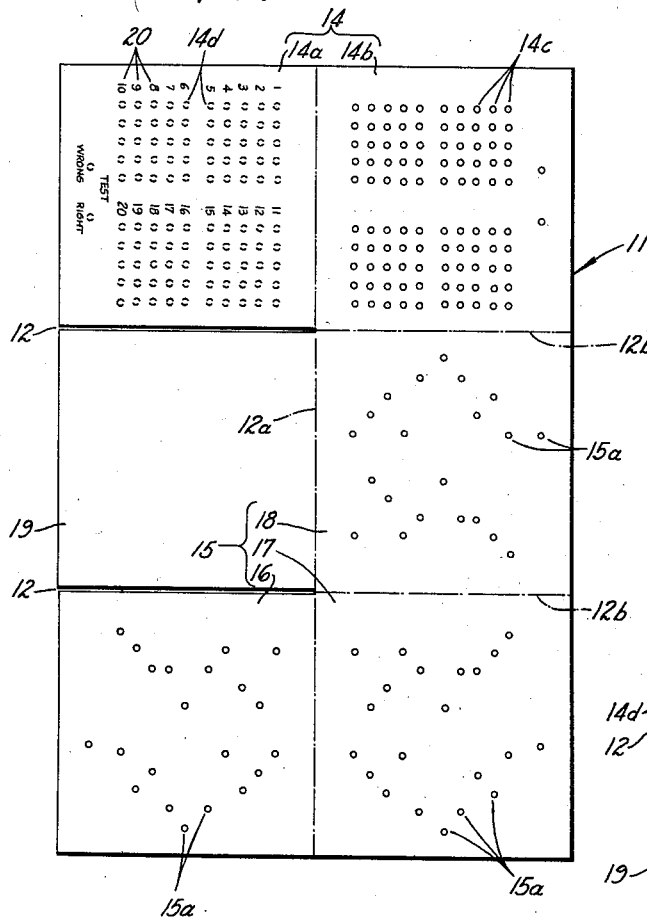
Fig. 3 is a plan view of the single sheet of material ready for folding to form the device.

Referring more particularly to the accompanying drawings, in Fig. 1, 10 indicates an answer card embodying the preferred form of my device for recording answers to multiple choice type of examination questions. This device 10 is preferably formed of a single sheet 11 of material such as heavy paper, cardboard or the like.

The answer card 10 is composed of a recording or work sheet 14 formed of two thicknesses or sections of the sheet material, the upper section, layer or lamina 14a overlying the section, layer or lamina 14b. Suitably imprinted on the working face of the recording or work sheet 14 are the question numbers 20 and opposite each question number are subdivisions or indicia indicating multiple answers to the question, all separately indicated by suitable indicia as illustrated. The answer indicating numbers or letters are spaced equally apart laterally of the recording sheet so that the indicating numbers or letters of the answers are arranged in vertical rows equally spaced apart.

2

In the present instance I have formed separable circular disks 14d in the first layer or lamina 14a on which are imprinted or otherwise formed the numbers or letters indicating the possible answers. I prefer that these disks be formed by die cutting through the layer or lamina 14a to an extent that these disks 14d may be punched out of the layer or lamina 14a by means of a pencil or stylus. That is to say, the die cutting may be substantially through the thickness of the first layer 14a of the recording or work sheet 14 or the cut may be entirely through the sheet but not entirely throughout the circumference of the disks.

The second layer or lamina 14b of the work sheet has die cut holes 14c formed therein which are, when the sheet is properly assembled, in precise register with the disks of the recording sheet on which the indicia representing the subdivisions of the question are imprinted. The opening 14c in the second layer 14b are of a size that the disks, when punched out of the first layer 14a of recording sheet 14, may pass into the perforations 14c in the layer 14b.

However, I wish to point out at this time that I may prefer to make the layer 14a easily penetrable by a pencil or stylus. Therefore, for the purpose of this specification I use the term "penetrable" to include any means enabling a pencil or stylus to be punched through a recording sheet layer.

Underlying the recording or work sheet 14 is what I prefer to term an answer pattern sheet 15 formed of three layers, laminae or sections 16, 17 and 18, which are formed with punched holes 15a only for the correct answers, it being contemplated, of course, that there be but one correct answer for each question. For example, assuming that the correct answer to question "1" is answer designated by "c," there would be a hole, opening or socket 15a through the three sections 16, 17 and 18 in register with the penetrable point "c" in the recording sheet 14. Therefore, if a pencil or stylus is inserted through the recording sheet at the correct answer "c," the small disk 14d therein will be forced through the second layer 14b of the recording sheet 14 and thence downwardly into the socket or opening 15a in register therewith in the answer pattern sheet 15.

In the event that any attempt is made to press the pencil or stylus through the recording sheet at the indicia of a wrong answer, it will only penetrate and force the small disk 14d to the depth of the second layer 14b of the recording sheet 14, thus sensibly indicating to the user that the wrong answer has been selected. If the right answer has been selected, the disk, as previously stated, will, of course, pass almost completely through the pattern sheet 15, thus sensibly indicating that the correct answer has been selected.

In order to mask the pattern sheet 15, the sixth section or bottom lamina or sheet 19 is blank and underlies the answer pattern sheet 15 so as to mask the same and prevent the student from determining the correct pattern of answers.

The sheet 11 is cut in two places as at 12 and folded centrally and longitudinally along the line 12a and laterally along the lines 12b, which are in alignment with the cuts 12 so as to form six geometrical, equal and similar sections 14a, 14b, 16, 17, 18 and 19. These sections 14a, 14b, 16, 17, 18 and 19 are arranged in superposed fashion in precise register, as shown, with the edges of the sections aligning.

Although I prefer to cut and fold the sheet 11 in the manner set forth, the cutting and folding can be accomplished by those skilled in the art in various other fashions to reach the same ultimate result.

I wish to point out that after the sheet 11 is folded to form the composite answer card, adhesive is employed between the abutting faces of the sheet sections so that the answer card will become a unitary structure.

Figure 4:
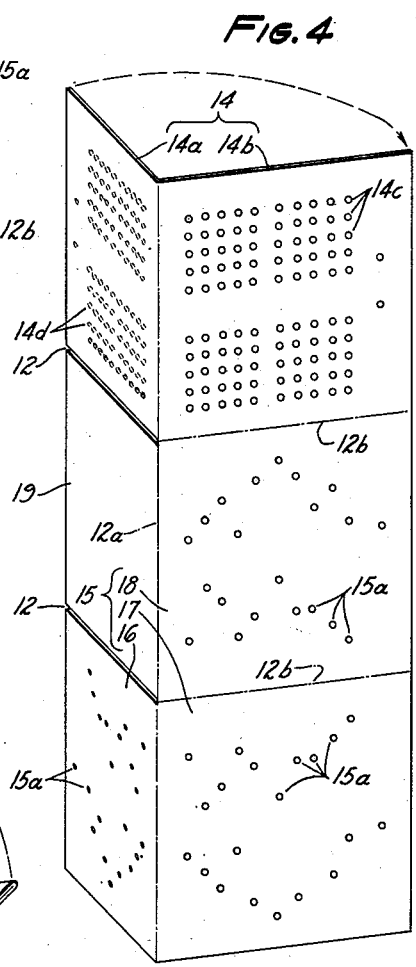
Fig. 4 is a perspective view of the sheet showing the first folding operation.
Figure 5:
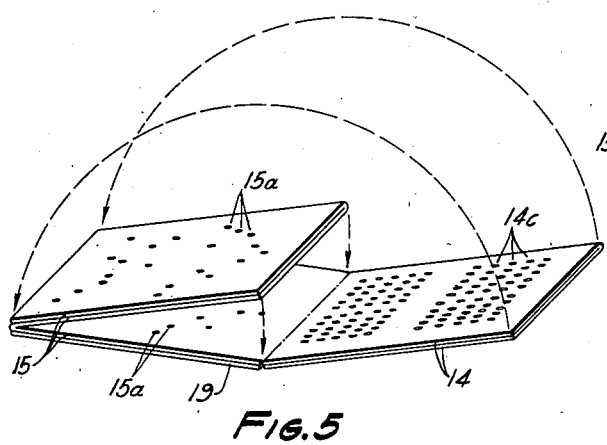
Fig. 5 is a perspective view of the sheet showing the second and third folding operations.

As illustrated in Fig. 4, the sheet is first folded along the longitudinal center thereof and then the sections 16 and 17 are positioned to overlie section 18, and then the sections 14a and 14b are folded to overlie the section 15, as illustrated in Fig. 5. This places the recording sheet layers 14a and 14b, the answer pattern layers 16, 17 and 18, and the backing layer 19 in correct relative positions, as described.

In the use of the device, it is constructed and assembled substantially as shown in the drawings and distributed to the student. The student then selects what he believes to be the correct answer to the question and projects a pencil or stylus through the indicia indicating his selected answer. If he has selected the incorrect answer, the small disk 14d will only penetrate to the bottom of the second layer of the recording sheet. In other words, the pencil or stylus will not penetrate deeply, sensibly indicating to him that he has selected the incorrect answer. If he has selected the correct answer, the instrument he is using as a punch will penetrate completely through the two layers of the recording sheet to almost the bottom of the answer pattern sheet, which sheet is composed of three layers of the material and is relatively thick, thus sensibly indicating to the student that he has selected the correct answer.

Due to the fact that the work sheet will record each punching, the examiner will, of course, immediately upon inspection thereof know how many incorrect answers the student selected prior to selecting the correct answer. It is an important feature of the device, of course, that the student be made sensibly aware when he has selected the correct answer because upon being apprised of this fact, he will not retain in his mind an incorrect answer to the question.

Due to the fact that the device may be formed of a single sheet of material, all of the component parts thereof can be cut and punched in a single operation and then requiring but one operation of assembly, thus enabling it to be produced relatively inexpensively. This is a considerable factor in devices of this kind for the reason that they are used but once and then must be discarded.

While I have disclosed the preferred embodiment of my invention and the preferred process of practicing the same and have disclosed various forms which my invention may assume, it is to be understood that various changes therein may be made by those skilled in the art without departing from the invention as claimed.

Having thus described my invention, what I claim and desire to secure by Letters Patent is:

1. A testing device cut and punched from a single sheet of paper, comprising a work panel having questions and a plurality of answers including an incorrect answer and a correct answer for each question indicated thereon, said work panel being punched to provide a partially formed disk in registry with each answer, an answer panel foldably connected to the work panel, said answer panel having holes punched therein to be in registry with the correct answers when the work panel and answer panel are folded together, and a masking panel foldable underneath the answer panel.

2. A testing device cut and punched from a single sheet of paper, comprising a work panel having questions and a plurality of answers including an incorrect answer and a correct answer for each question indicated thereon, said work panel being punched to provide a partially formed disk in registry with each answer, an answer panel foldably connected to the work panel, said answer panel having holes punched therein to be in registry with the correct answers when the work panel and answer panel are folded together, and a masking panel foldable underneath the answer panel, said panels being in folded, superposed relationship to provide a laminar assembly and being fixed in said relationship to provide a compact article.

3. A testing device cut and punched from a single sheet of paper, comprising a work panel having questions and a plurality of answers including an incorrect answer and a correct answer for each question indicated thereon, said work sheet being punched to provide a partially formed disk in registry with each answer, a plurality of answer panels foldably connected to each other so as to be foldable into superposed laminar relationship and one of said answer panels being foldably connected to said work panel, said answer panels having holes punched therein to be in registry with the correct answers when the work panel and answer panels are in folded relationship, and a masking panel foldable underneath the answer panels.

4. A testing device comprising a rectangular sheet of paper of greater length than breadth divided into separate panels of identical shape and size and consisting of a top work panel, a bottom answer panel, and an intermediate masking panel arranged on one side of the longitudinal medial line of the sheet, said intermediate panel being cut away from said top and bottom panels, and a top perforate panel and intermediate and bottom answer panels on the other side of the medial line foldably connected to the work panel, the masking panel and the first-mentioned bottom answer panel, respectively; said work panel being printed with a plurality of questions and a plurality of answers for each question, including a correct answer and an incorrect answer and being punched to provide a partially formed disk for each answer; said masking panel being imperforate; said perforate panel having holes punched therein to be in registry with the answers on the answer panel when the work panel and perforate panel are in folded relationship; and said answer panels having holes punched therein to be in registry with the correct answers on the work panel when the answer panels are in folded relationship with the work panel.

RICHARD WISTAR.

REFERENCES CITED

The following references are of record in the file of this patent:

UNITED STATES PATENTS

| Number | Name | Date |
|---|---|---|
| 1,490,934 | McDade | Apr. 22, 1924 |
| 1,644,160 | Thompson | Oct. 4, 1927 |
| 1,670,254 | Gowin | May 15, 1928 |
| 1,860,909 | Taylor | May 31, 1932 |